(12) United States Patent
Resconi et al.

(10) Patent No.: US 7,534,848 B2
(45) Date of Patent: *May 19, 2009

(54) 1-BUTENE COPOLYMERS AND PROCESS FOR PREPARING THEM

(75) Inventors: Luigi Resconi, Ferrara (IT); Anteo Pelliconi, Occhiobello (IT); Enea Garagnani, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/536,857

(22) PCT Filed: Nov. 14, 2003

(86) PCT No.: PCT/EP03/12944

§ 371 (c)(1),
(2), (4) Date: May 27, 2005

(87) PCT Pub. No.: WO2004/050713

PCT Pub. Date: Jun. 17, 2004

(65) Prior Publication Data

US 2006/0084769 A1  Apr. 20, 2006

Related U.S. Application Data

(60) Provisional application No. 60/431,802, filed on Dec. 9, 2002.

(30) Foreign Application Priority Data

Dec. 4, 2002 (EP) ................... 02080121

(51) Int. Cl.
C08F 4/602 (2006.01)
C08F 4/6192 (2006.01)
C08F 210/08 (2006.01)
B01J 31/22 (2006.01)

(52) U.S. Cl. ............ 526/348.6; 526/160; 526/161; 526/165; 526/943

(58) Field of Classification Search ............ 526/160, 526/161, 348.6, 943, 165, 248.6
See application file for complete search history.

(56) References Cited

U.S. PATENT DOCUMENTS

| 4,298,722 A | 11/1981 | Collette et al. |
| 4,971,936 A | 11/1990 | Wilson et al. |
| 5,132,381 A | 7/1992 | Winter et al. |
| 5,145,819 A | 9/1992 | Winter et al. ........... 502/117 |
| 5,276,208 A | 1/1994 | Winter et al. |
| 5,455,366 A | 10/1995 | Rohrmann et al. |
| 5,532,396 A | 7/1996 | Winter et al. |
| 5,576,260 A | 11/1996 | Winter et al. |
| 5,612,428 A | 3/1997 | Winter et al. |
| 5,616,747 A | 4/1997 | Rohrmann et al. |
| 5,696,045 A | 12/1997 | Winter et al. |
| 5,698,487 A | 12/1997 | Sacchetti et al. |
| 5,700,886 A | 12/1997 | Winter et al. |
| 5,786,432 A | 7/1998 | Küber et al. ........... 526/127 |
| 5,830,821 A | 11/1998 | Rohrmann et al. |
| 5,859,159 A * | 1/1999 | Rossi et al. ........... 526/170 |
| 5,965,756 A | 10/1999 | McAdon et al. |
| 6,034,022 A | 3/2000 | McAdon et al. |

(Continued)

FOREIGN PATENT DOCUMENTS

DE 19917985 10/2000

(Continued)

OTHER PUBLICATIONS

V. Busico et al., "Regiospecificity of 1-butene polymerization catalyzed by $C_2$-symmetric group IV metallocenes," *Macromol. Rapid Commun.*, vol. 16, p. 269-274 (1995).

(Continued)

*Primary Examiner*—Caixia Lu
(74) *Attorney, Agent, or Firm*—William R Reid

(57) ABSTRACT

A process comprising contacting 1-butene and one or more alpha-olefins under polymerization conditions in the presence of a catalyst system obtainable by contacting: (A) a metallocene compound of formula (I)

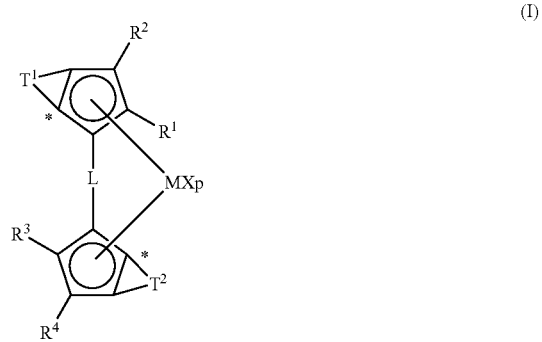

(I)

wherein: M is an atom of a transition metal; p is an integer from 0 to 3; X, same or different, are hydrogen atoms, halogen atoms, or an hydrocarbon group; L is a divalent bridging group; $R^1$ and $R^3$ are hydrocarbon groups; $R^2$ and $R^4$ are hydrogen atoms or hydrocarbon groups; $T^1$ and $T^2$, equal to or different from each other are a moiety of formula (II), (III) or (IV):

wherein: $R^5$, $R^6$, $R^7$, $R^8$ and $R^9$, equal to or different from each other, are hydrogen or hydrocarbon groups; and (B) an alumoxane or a compound able to form an alkylmetallocene cation.

11 Claims, No Drawings

U.S. PATENT DOCUMENTS

| | | | |
|---|---|---|---|
| 6,084,115 A | 7/2000 | Chen et al. | |
| 6,124,231 A | 9/2000 | Fritze et al. | |
| 6,143,827 A | 11/2000 | Morizono et al. | |
| 6,150,481 A | 11/2000 | Winter et al. | |
| 6,156,844 A | 12/2000 | Hashimoto et al. | |
| RE37,384 E | 9/2001 | Winter et al. | |
| 6,329,479 B1 | 12/2001 | Arai et al. | |
| 6,369,254 B1 | 4/2002 | Resconi et al. | |
| 6,399,533 B2 | 6/2002 | Sacchetti et al. | |
| 6,444,833 B1 | 9/2002 | Ewen et al. | |
| 6,448,350 B1 | 9/2002 | Dall'Occo et al. | |
| 6,451,938 B1 | 9/2002 | Fisher et al. | |
| 6,469,114 B1 | 10/2002 | Schottek et al. | |
| 6,479,424 B1 | 11/2002 | Ernst et al. | |
| 6,482,902 B1 | 11/2002 | Bohnen et al. | |
| 6,635,779 B1 * | 10/2003 | Ewen et al. | 556/11 |
| 6,930,160 B2 | 8/2005 | Minami et al. | 526/348.6 |
| 6,987,196 B2 | 1/2006 | Resconi et al. | |
| 7,074,864 B2 * | 7/2006 | Resconi | 526/160 |
| 7,115,761 B2 | 10/2006 | Resconi et al. | |
| 7,166,683 B2 | 1/2007 | Resconi | |
| 7,241,903 B2 | 7/2007 | Fritze et al. | |
| 2003/0008984 A1 | 1/2003 | Kratzer et al. | 526/127 |
| 2003/0013913 A1 | 1/2003 | Schottek et al. | 564/8 |
| 2003/0149199 A1 | 8/2003 | Schottek et al. | |
| 2004/0132612 A1 | 7/2004 | Resconi et al. | |
| 2004/0242815 A1 | 12/2004 | Resconi et al. | |
| 2004/0254315 A1 | 12/2004 | Resconi | |
| 2006/0052553 A1 * | 3/2006 | Resconi et al. | 526/127 |
| 2006/0155071 A1 | 7/2006 | Morini et al. | |
| 2006/0167195 A1 | 7/2006 | Resconi et al. | |

FOREIGN PATENT DOCUMENTS

| | | |
|---|---|---|
| DE | 19962814 | 6/2001 |
| DE | 19962910 | 7/2001 |
| EP | 172961 | 3/1986 |
| EP | 0186287 | 7/1986 |
| EP | 0352362 | 1/1990 |
| EP | 353318 | 2/1990 |
| EP | 485823 | 5/1992 |
| EP | 549900 | 7/1993 |
| EP | 633272 | 1/1995 |
| EP | 775707 | 5/1997 |
| EP | 982328 | 3/2000 |
| GB | 1460795 | 1/1977 |
| JP | 60262804 | 12/1985 |
| JP | 62119213 | 5/1987 |
| JP | 03126704 | 5/1991 |
| WO | 91/02012 | 2/1991 |
| WO | 9200333 | 1/1992 |
| WO | 92/05208 | 4/1992 |
| WO | 9532995 | 12/1995 |
| WO | 9822486 | 5/1998 |
| WO | 9921899 | 5/1999 |
| WO | 99/40129 | 8/1999 |
| WO | 99/45043 | 9/1999 |
| WO | 99/46270 | 9/1999 |
| WO | 0121674 | 3/2001 |
| WO | 0144318 | 6/2001 |
| WO | 0144319 | 6/2001 |
| WO | 0162764 | 8/2001 |
| WO | 0216450 | 2/2002 |
| WO | 02/100908 | 12/2002 |
| WO | 02100908 | 12/2002 |
| WO | 02100909 | 12/2002 |
| WO | 03042258 | 5/2003 |
| WO | 2004/033510 | 4/2004 |
| WO | 04050724 | 6/2004 |

OTHER PUBLICATIONS

C. J. Carman et al., "Monomer Sequence Distribution in Ethylene-Propylene Rubber Measured by $^{13}$C NMR 3. Use of Reaction Probability Model," *Macromolecules*, vol. 10, p.536 (1977).

J. Suhm et al., "Influence of metallocene structures on ethene copolymerization with 1-butene and 1-octene," *Journal of Molecular Catalysis*, vol. 128, p. 215-227 (1998).

A. Rossi et al., "End Groups in 1-Butene Polymerization via Methylaluminoxane and Zirconocene Catalyst," *Macromolecules*, vol. 28(6), p. 1739-1749 (1995).

N. Naga et al., "Effect of co-catalyst system on a α-olefin polymerization with *rac*- and *meso*-[dimethylsilylenebis(2,3,5-trimethylcyclopentadienyl}]zirconium dichloride," *Macromol. Rapid Commun.*, vol. 18, p. 581-589 (1997).

M. Vathauer et al., "Homopolymerizations of α-olefins with Diastereomeric Metallocene/MAO Catalysts," *Macromolecules*, vol. 33(6), p. 1955-1959 (2000) XP-002344858.

N. Naga et al., "Polymerization behavior of α-olefins with *rac*- and *meso* -type *ansa*-metallocene catalysts: Effects of cocatalyst and metallocene ligand," *Macromol. Chem. Phys.*, vol. 200(7), p. 1587-1594 (1999) XP-002344858.

J. Ewen et al., "Polymerization Catalysts with Cyclopentadienyl Ligands Ring-Fused to Pyrrole and Thiophene Heterocycles," *J. Am. Chem. Soc.*, vol. 120(41), p. 10786-10787 (1998).

U.S. Appl. No. 11/376,409, issued Mar. 15, 2006, Resconi.

R. Halterman et al., "Synthesis and structure of [1,2-bis(1-indenyl)benzene]titanium and zirconium dichlorides," *Journal of Organometallic Chemistry*, vol. 568, p. 41-51 (1998).

Office Action from currently pending U.S. Appl. No. 10/536,858 with mail date Dec. 13, 2007.

Office Action from currently pending U.S. Appl. No. 10/480,762 with mail date Dec. 20, 2007.

* cited by examiner

1-BUTENE COPOLYMERS AND PROCESS FOR PREPARING THEM

This application is the U.S. national phase of International Application PCT/EP2003/012944, filed Nov. 14, 2003, claiming priority to European Patent Application 02080121.3 filed Dec. 4, 2002, and the benefit under 35 U.S.C. 119(e) of U.S. Provisional Application No. 60/431,802, filed Dec. 9, 2002; the disclosures of International Application PCT/EP2003/012944, European Patent Application 02080121.3 and U.S. Provisional Application No. 60/431,802, each as filed, are incorporated herein by reference.

The present invention relates to a process for preparing copolymers of 1-butene and $C_5$-$C_{22}$ alpha olefins by using a metallocene-based catalyst system, and to copolymers obtained by this process.

1-Butene higher alpha-olefin polymers are known as semi-rigid resins. Due to their excellent transparency, surface non tackiness and other tensile properties they can be used, for example, for the production of packaging films or sheets or other melt-molded articles. In the art these copolymers are obtained by using titanium based catalysts. For example EP 186 287 describes 1-butene random copolymers obtained by using titanium tetrachloride supported on magnesium chloride and vinyltrietoxysilane as external donor. EP 352 362 describes 1-butene copolymers obtained by using titanium based catalyst systems, diisobutyl phthalate as internal donor and 1,8 cineole as external donor; moreover in the comparative examples vinyltrietoxysilane is also used as external donor.

When a titanium based catalyst is used the yield of the above process is very low. Moreover the distribution of the comonomer, as shown by the fraction of polymer soluble in diethyl ether, is not very good and can be improved.

Recently in WO 02/16450 low isotactic 1-butene copolymers obtained by using metallocene-based catalyst systems have been described. These copolymers are not endowed with high values of isotacticity.

A new process that permits to obtain an isotactic 1-butene copolymer with high molecular weight, in high yield and with a good distribution of the comonomer is therefore desirable. An object of the present invention is a process for preparing isotactic 1-butene copolymers containing up to 30% by mol of one or more alpha olefins of formula $CH_2$=CHZ derived units, wherein Z is a $C_3$-$C_{20}$ hydrocarbon group comprising, contacting 1-butene and one or more of said alpha-olefins, under polymerization conditions, in the presence of a catalyst system obtainable by contacting:

a) at least a metallocene compound of formula (I)

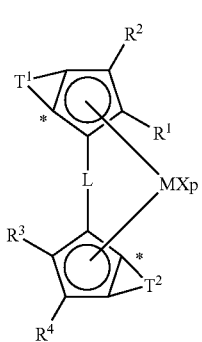

(I)

wherein

M is a transition metal belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, equal to or different from each other, are hydrogen atoms, halogen atoms, R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group;

more preferably X is chlorine or a methyl radical;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, and $C_7$-$C_{20}$ arylalkylidene radicals optionally containing heteroatoms belonging to groups 13-17 of the Periodic Table of the Elements, and silylidene radical containing up to 5 silicon atoms such as $SiMe_2$, $SiPh_2$;

preferably L is selected from the group consisting of is $Si(CH_3)_2$, $SiPh_2$, SiPhMe, $SiMe(SiMe_3)$, $CH_2$, $(CH_2)_2$, $(CH_2)_3$ and $C(CH_3)_2$;

$R^1$ and $R^3$, equal to or different from each other, are linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$arylalkyl radicals, optionally containing heteroatoms belonging to groups 13-17 of the Periodic Table of the Elements;

$R^2$ and $R^4$, equal to or different from each other, are hydrogen atoms or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radicals, optionally containing heteroatoms belonging to groups 13-17 of the Periodic Table of the Elements; preferably they are hydrogen atoms.

$T^1$ and $T^2$, equal to or different from each other are moieties of formulas (II), (III) or (IV):

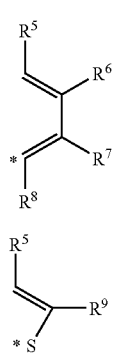

(II)

(III)

-continued

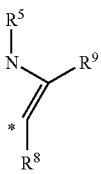
(IV)

wherein: the atom marked with the symbol * is bound to the atom marked with the same symbol in formula (I);

$R^5$, $R^6$, $R^7$, $R^8$ and $R^9$, equal to or different from each other, are hydrogen atoms, or a linear or branched saturated or unsaturated $C_1$-$C_{20}$-alkyl, $C_3$-$C_{20}$-cycloalkyl, $C_6$-$C_{40}$-aryl, $C_7$-$C_{40}$-alkylaryl, $C_7$-$C_{40}$-arylalkyl radicals, optionally containing heteroatoms belonging to groups 13-17 of the Periodic Table of the Elements;

$R^6$ and $R^7$ can also join to form a saturated or unsaturated condensed 5 to 7 membered ring optionally containing heteroatoms belonging to groups 13-16 of the Periodic Table of the Elements; preferably $R^9$ is hydrogen or a linear or branched saturated or unsaturated $C_1$-$C_{20}$-alkyl radical;

b) at least an alumoxane or a compound able to form an alkylmetallocene cation; and c) optionally an organo aluminum compound.

Preferred metallocene compounds of formula (I) belongs to the following subclasses:

Subclass (1)

Metallocene compounds belonging to subclass (1) have the following formula (V):

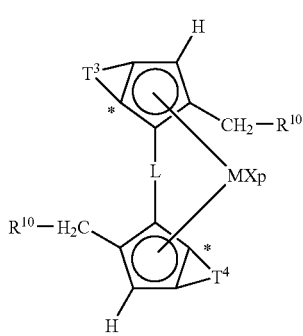
(V)

wherein M, L, X and p have been described above;

$R^{10}$, equal to or different from each other, are hydrogen atoms, or linear or branched saturated or unsaturated $C_1$-$C_{19}$-alkyl, $C_3$-$C_{19}$-cycloalkyl, $C_6$-$C_{19}$-aryl, $C_7$-$C_{19}$-alkylaryl $C_7$-$C_{19}$-arylalkyl radicals, optionally containing heteroatoms belonging to groups 13-17 of the Periodic Table of the Elements; preferably $R^{10}$ is a hydrogen atom or a $C_1$-$C_{19}$-alkyl radical, more preferably $R^{10}$ is hydrogen, methyl or ethyl;

$T^3$ and $T^4$, equal to or different from each other are moieties of formula (Va), (Vb) or (Vc):

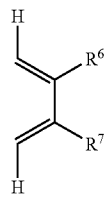
(Va)

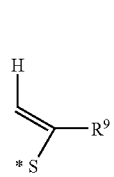
(Vb)

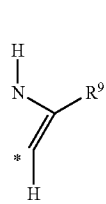
(Vc)

wherein: the atom marked with the symbol * bonds in formula (V) the atom marked with the same symbol;

$R^6$, $R^7$ and $R^9$ have been defined above;

Preferably $R^6$ and $R^7$ are hydrogen atoms or linear or branched saturated or unsaturated $C_1$-$C_{20}$-alkyl radicals, or they form a saturated or unsaturated 5 or 6 membered ring optionally containing heteroatoms belonging to groups 13-16 of the Periodic Table of the Elements;

Preferably $R^9$ is a linear or branched saturated or unsaturated $C_1$-$C_{20}$-alkyl radical.

Subclass (2)

Metallocene compounds belonging to subclass (2) have the following formula (VD):

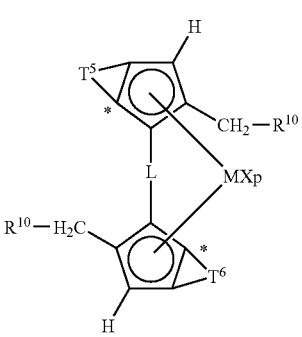
(VI)

wherein $R^{10}$, M, L, X and p have been described above;

$T^5$ and $T^6$, equal to or different from each other are moieties of formula (VIa), (VIb) or (VIc):

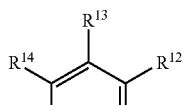
(VIa)

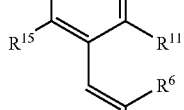
(VIb)

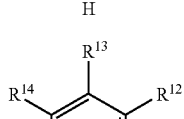
(VIc)

wherein: the atom marked with the symbol * is bound to the atom marked with the same symbol in formula (VI);

$R^6$, $R^7$ and $R^9$, have been defined above;

Preferably $R^6$ and $R^7$ are hydrogen atoms or linear or branched saturated or unsaturated $C_1$-$C_{20}$-alkyl radicals; or they form a saturated or unsaturaded 5 or 6 membered ring optionally containing heteroatoms heteroatoms belonging to groups 13-16 of the Periodic Table of the Elements;

Preferably $R^9$ is a hydrogen atom or a linear or branched saturated or unsaturated $C_1$-$C_{20}$-alkyl radical;

$R^{11}$, $R^{12}$, $R^{13}$, $R^{14}$, and $R^{15}$, equal to or different from each other, are hydrogen atoms or linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radicals, optionally containing heteroatoms belonging to groups 13-17 of the Periodic Table of the Elements, or two adjacent groups can form together a saturated or unsaturated condensed 5 or 6 membered ring optionally containing heteroatoms belonging to groups 13-16 of the Periodic Table of the Elements; preferably $R^{11}$ is a $C_1$-$C_{20}$-alkyl radical; more preferably $R^{11}$ is a methyl radical; preferably $R^{14}$ is a hydrogen atom or a $C_1$-$C_{20}$-alkyl radical; more preferably $R^{14}$ is a methyl radical; preferably $R^{12}$, $R^{13}$ and $R^{15}$ are hydrogen atoms.

Metallocene compounds belonging to formulas (I), (V) and (VI) are well known in the art; in particular they are described in U.S. Pat. No. 5,145,819, EP-A-0 485 823, WO 98/22486, WO 01/44318, U.S. Pat. No. 5,786,432 and EP02080120.5.

Preferably the metallocene compounds of formula (I) are in the racemic (rac) form.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds according to WO 99/21899 and WO01/21674 are: tris(2,3,3-trimethyl-butyl)aluminium, tris(2,3-dimethylhexyl)aluminium, tris(2,3-dimethylbutyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris(2-ethyl-3-methyl-pentyl)aluminium, tris(2,3-diethyl-pentyl) aluminium, tris(2-propyl-3-methyl-butyl)aluminium, tris (2-isopropyl-3-methyl-butyl)aluminium, tris(2-isobutyl-3-methyl-pentyl)aluminium, tris(2,3,3-trimethyl-pentyl) aluminium, tris(2,3,3-trimethyl-hexyl)aluminium, tris(2-ethyl-3,3-dimethylbutyl)aluminium, tris(2-ethyl-3,3-dimethyl-pentyl)aluminium, tris(2-isopropyl-3,3-dimethylbutyl)aluminium, tris(2-trimethylsilyl-propyl) aluminium, tris(2-methyl-3-phenyl-butyl)aluminium, tris (2-ethyl-3-phenyl-butyl)aluminium, tris(2,3-dimethyl-3-phenyl-butyl)aluminium, tris(2-phenyl-propyl) aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl) aluminium, tris(3-methyl-2-phenyl-butyl)aluminium, tris (2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis (trifluoromethyl)phenyl. Tetrakis-pentafluorophenyl borate is particularly preferred examples of these compounds are described in WO 91/02012. Moreover, compounds of the formula BAr₃ can conveniently be used. Compounds of this type are described, for example, in the published International patent application WO 92/00333. Other examples of compounds able to form an alkylmetallocene cation are compounds of formula BAr₃P wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)amnoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate.

Organic aluminum compounds used as compound c) are those of formula $H_jAlU_{3-j}$ or $H_jAl_2U_{6-j}$ described above.

The polymerization process of the present invention can be carried out in liquid phase. The polymerization medium can be 1-butene optionally in the presence of an inert hydrocarbon solvent. Said hydrocarbon solvent can be either aromatic (such as toluene) or aliphatic (such as propane, hexane, heptane, isobutane, cyclohexane and 2,2,4-trimethylpentane). Otherwise the polymerization process of the present invention can be carried out in a gas phase. Preferably the polymerization is carried out by using liquid 1-butene as the polymerization medium (bulk polymerization).

The catalyst system of the present invention can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent, such as hydrocarbon selected from toluene, hexane, pentane and propane and at a temperature ranging from 0° C. to 100° C., more from 30° C. to 60° C.

A particularly suitable process for supporting the catalyst system is described in WO01/44319, wherein the process comprises the steps of:
(a) preparing a catalyst solution comprising a soluble catalyst component;
(b) introducing into a contacting vessel:
(i) a porous support material in particle form, and
(ii) a volume of the catalyst solution not greater than the total pore volume of the porous support material introduced;
(c) discharging the material resulting from step (b) from the contacting vessel and suspending it in an inert gas flow, under such conditions that the solvent evaporates; and
(d) reintroducing at least part of the material resulting from step (c) into the contacting vessel together with another volume of the catalyst solution not greater than the total pore volume of the reintroduced material.

A suitable class of supports comprises porous organic supports functionalized with groups having active hydrogen atoms. Particularly suitable are those in which the organic support is a partially crosslinked styrene polymer. Supports of this type are described in EP 633 272.

Another class of inert supports particularly suitable for use according to the invention is that of polyolefin porous prepolymers, particularly polyethylene.

A further suitable class of inert supports for use according to the invention is that of porous magnesium halides, such as those described in WO 95/32995.

The polymerization temperature preferably ranges from 0° C. to 250° C.; preferably comprised between 20° C. and 150° C. and, more particularly between 40° C. and 90° C.

The molecular weight distribution of the polymer obtained with the process of the present invention can be varied by using mixtures of different metallocene compounds or mixtures of the metallocene compound of formula (I) and a Ziegler-Natta catalyst or by carrying out the polymerization in several stages at different polymerization temperatures and/or different concentrations of the molecular weight regulators and/or different monomer concentration.

The polymerization yield depends on the purity of the transition metal organometallic catalyst compound a) in the catalyst, therefore, said compound can be used as such or can be subjected to purification treatments before use.

With the process according to the present invention it is possible to prepare isotactic 1-butene copolymers containing up to 30% by mol of units derived from one or more alpha-olefins of formula $CH_2=CHZ$, wherein Z is a $C_3$-$C_{20}$ hydrocarbon group. Examples of alpha-olefins are 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred comonomers are-1-pentene, 1-hexene and 1-octene; preferably the comonomer is 1-hexene.

Preferably the content of said alpha olefins derived units ranges from 2% to 20% by mol, more preferably from 3% to 17% by mol.

The 1-butene copolymers obtained with the process of the present invention are highly isotactic, and show a high molecular weight, that renders them useful for an industrial use. Moreover the 1-butene copolymers object of the present invention are characterised by high content of diethylether solubles that is an indication of good comonomer distribution. Furthermore 4,1 regioinsertions of 1-butene are present in the polymer chain. The presence of 4,1 regioerrors along the polymer chain enhances the effect of the introduction of the comonomer, thus lowering the degree of crystallinity. The presence of 4,1 insertions of 1-butene may be evaluated by $^{13}$C-NMR. Assignments of 4,1 insertion can be made according to Busico (V. Busico, R. Cipullo, A. Borriello, *Macromol. Rapid. Commun.* 1995, 16, 269-274)

Thus, a further object of the present invention is an isotactic 1-butene copolymer containing up to 30% by mol of units derived from one or more alpha-olefins of formula $CH_2=CHZ$, wherein Z is a $C_3$-$C_{20}$ hydrocarbon group having the following features:

isotactic pentads (mmmm)>90%; preferably >95%; more preferably >98%; and the percentage of soluble fraction in diethylether (% SD) and the molar content of said alpha-olefin (% O) in the polymer chain meet the following relation:

% SD>2.8% O+8.

Preferably the relation is % SD>2.8% O+10; more preferably the relation is % SD>2.8% O+15; a further preferred relation is % SD>2.8% O+20.

When the content of alpha olefins is comprised between 10% and 30% the copolymers obtained according to the present invention are characterized by the following features:

isotactic pentads (mmmm)>90%; preferably >95%; more preferably >98%; and percentage of soluble fraction in diethylether >92%; preferably >94%.

Preferably the content of alpha-olefin derived units is comprised between 11% and 25%. When the content of alpha olefin is comprised between 5% and 12% the copolymers obtained according to the present invention are characterized by the following features:

isotactic pentads (mmmm)>90%; preferably >95%; more preferably >98%; and percentage of soluble fraction in diethylether >41%; preferably >46%.

The 1-butene copolymers obtained according to the present invention are further characterized by the presence of 4,1 insertions in the polymer chain. Thus a further object of the present invention is an isotactic 1-butene copolymer containing up to 30% by mol of units derived from one or more alpha-olefins of formula $CH_2=CHZ$, wherein Z is a $C_3$-$C_{20}$ hydrocarbon group having the following features:

isotactic pentads (mmmm)>90%; preferably >95%; more preferably >98%; and presence of 4,1 insertions in the polymer chain.

Preferably the 4,1 insertions are higher than 0.02%, more preferably they are comprised between 0.05% and 0.4%.

The 1-butene copolymers object of the present invention are further endowed with a molecular weight distribution Mw/Mn<4; preferably Mw/Mn<3; more preferably Mw/Mn<2.5.

The molecular weight (I.V.) measured in decahydronaphtalene is higher than 1 dl/g, preferably higher than 1.25 dl/g.

The 1-butene copolymers of the present invention can be advantageously used as components in blend with other polyolefins such as isotactic or syndiotactic polypropylene homo and copolymer, 1-butene homopolymer, and ethylene homo and copolymer. The following examples are given to illustrate and not to limit the invention.

EXPERIMENTAL SECTION

The intrinsic viscosity (I.V.) was measured in decahydronaphthalene (DHN) at 135°.

The melting points of the polymers ($T_m$) were measured by using a Perkin-Elmer DSC-7 calorimeter equipped with Pyris 1 software. The instrument was calibrated at indium and zinc melting points with particular attention in determining the baseline with required accuracy.

Melting points were measured according to the following method a weighted sample (4-8 mg) obtained from the polymerization was sealed into an aluminum pan, the sample was then subjected to the following thermal treatment:

i) first heating run from room temperature to 180° C. with a scanning rate of 10° C./min;

ii) annealing run at 180° C. for 5 minutes;

iii) crystallization run from 180° C. to 0° C., at 10° C./min in order to crystallize the sample under controlled conditions;

iv) second heating run from room temperature to 180° C.

In this second heating run, the maximum peak temperature was taken as the melting temperature ($T_m$).

The molecular weight distribution was determined on a WATERS 150 C using the following chromatographic conditions:

| | |
|---|---|
| Columns: | 3× SHODEX AT 806 MS; 1× SHODEX UT 807; 1× SHODEX AT-G; |
| Solvent: | 1,2,4 trichlorobenzene (+0.025% 2,6-Di-tert.Butyl-4-Methyl-Phenol); |
| Flow rate: | 0.6–1 ml/min; |
| Temperature: | 135° C.; |
| Detector: | INFRARED AT $\lambda \cong 3.5$ µm; |
| Calibration: | Universal Calibration with PS-Standards. |

$^{13}$C-NMR spectra were acquired on a DPX-400 spectrometer operating at 100.61 MHz in the Fourier transform mode at 120° C. The peak of the $2B_2$ carbon (nomenclature according to Carman, C. J.; Harrington, R. A.; Wilkes, C. E. *Macromolecules* 1977, 10, 535) was used as internal reference at 27.73. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove 1H-13C coupling. About 600 transients were stored in 32K data points using a spectral window of 6000 Hz. Assignments of 4,1 insertion were made according to Busico (V. Busico, R. Cipullo, A. Borriello, *Macromol. Rapid. Commun.* 1995, 16, 269-274).

Diethyl Ether Solubility

About 1 gram of polymer was transferred to a glass flask equipped with a magnetic stirrer and 250 cc of diethyl ether was added. The solution was stirred for 24 hours at room temperature under $N_2$ to dissolve the soluble fraction of the polymer. After the dissolution the liquid was filtered with a paper filter, to separate the remaining solid from the solution, and was transferred to a glass flask, previously weighted. The solvent was removed under vacuum and the polymer obtained was dried in a warm vacuum oven for 1 day to eliminate all solvent traces. The flask was weighted and the quantity of soluble polymer was determined.

Preparation of Catalyst Components

Rac dimethylsilylbis(2-methyl-indenyl) zirconium dichloride (A-1) was prepared according to U.S. Pat. No. 5,145,819. Rac dimethylsilandiylbis-6-[2,5-dimethyl-3-(2',5'-dimethylphenyl) cyclopentadienyl-[1,2-b]-thiophene]zirconium dichloride (A-2) is prepared according to WO01/44318.

The cocatalyst methylalumoxane (MAO) was a commercial product which was used as received (Witco AG, 10% wt/vol toluene solution, 1.7 M in Al).

Catalyst Solution Preparation Procedure 3 mg of the metallocene compounds indicated in table 1 were added to a toluene solution of methylalumoxane (MAO 10% weight/volume) to obtain the desired MAO/Zr ratio. If necessary, additional toluene was added to obtain a final volume of 5-10 ml, easy to be fed into the autoclave. The catalyst solution was inserted into the steel cylinder and then fed into the autoclave as reported above.

Polymerization Examples 1-8

A 4.25 litres steel autoclave, equipped with magnetically stirred anchor (usual stirring rate 550 rpm) and with a Flow Record & Control systems (FRC) having maximum flow rate of 9000 gr/hour for 1-butene, was purged with hot nitrogen (1.5 barg $N_2$, 70° C., 1 hour). Then, stirring was started and 1-butene and 1-hexene were fed into the reactor (amounts indicated in table 1). Subsequently, the reactor inner temperature was raised from 30° C. to the polymerisation temperature of 70° C. When pressure and temperature were constant, the catalytic solution was fed into the reactor with a nitrogen overpressure and the polymerization was carried out for the time indicated in table 1.

Then the stirring was interrupted; the pressure into the autoclave was raised to 20 bar-g with nitrogen. The bottom discharge valve was opened and the comonomer/copolymer mixture was discharged into the heated steel tank containing water at 70° C. The tank heating was switched off and a flux of 0.5 bar-g nitrogen was fed. After 1 hour cooling at room temperature the steel tank was opened and the wet polymer collected. The wet polymer was dried in a oven under nitrogen at 70° C. The polymerization conditions and the characterization data of the obtained polymers are reported in Table 1.

Characterization of Copolymers

Samples of polymer obtained from examples 1 and 2 and a sample of an 1-butene/ethyle copolymer having an ethylene content of 2.3% by wt prepared according to example 11 of PCT/EP02/06574 (sample A used for comparison) were mixed in a Brabender® chamber with 1% 2,6-di-t-butyl-4-methyl phenol (BHT) at 180° C. and then transformed in 1.9 and 4 mm thick plaques through compression molding at 200° C. with an cooling of 30'/min.

The 1.9 mm thick plaques were submitted to tensile test (according to ASTM D 638 method), while the 4.0 mm thick plaques were submitted to the flexural modulus determination according to ISO 178 method.

tensile modulus was calculated according the following equation:

tensile modulus=(1–3% chord)=(T3%–T1%)/0.02 wherein T3%=stress at 3% deformation; and
wherein T1%=stress at 1% deformation.

The results are reported in table 2

TABLE 1

| Ex. | Met | Al/Zr | liquid phase composition | | time min | Activity $kg/g_{met}*h$ | $C_6$ % mol (NMR) |
|---|---|---|---|---|---|---|---|
| | | | 1-Butene, g | 1-Hexene, g | | | |
| 1 | A-2 | 1000 | 1350 | 69 | 30 | 135.3 | 3.22 |
| 2 | A-2 | 1000 | 1290 | 140 | 15 | 296.0 | 5.94 |
| 3 | A-2 | 1000 | 1216 | 226 | 60 | 111.3 | 11.2 |
| 4 | A-2 | 1000 | 1140 | 314 | 60 | 85.3 | 15.8 |
| 5 | A-1 | 675 | 1350 | 69 | 60 | 139 | 3.6 |
| 6 | A-1 | 675 | 1290 | 140 | 60 | 202 | 7.28 |
| 7 | A-1 | 500 | 1216 | 226 | 60 | 70 | 9.34 |
| 8 | A-1 | 675 | 1140 | 314 | 60 | 32 | 16.7 |

| Ex | 4.1 insertions % | I.V. (DHN, dL/g) | $T_m(II)$ ° C. | $\Delta H_f$ J/g | $M_w/M_n$ | % SD % | mmmm % |
|---|---|---|---|---|---|---|---|
| 1 | 0.22 | 1.56 | 94.0 | 27.3 | 2.1 | n.a. | >95 |
| 2 | 0.30 | 1.30 | 80.4 | 14.6 | 2.4 | 76.9 | >95 |
| 3 | n.a. | 1.48 | 59.6 | 10.9 | 2.2 | 94.1 | >95 |
| 4 | 0.26 | 1.44 | 54.9 [a] | n.a. | 2.1 | n.a. | >95 |
| 5 | 0.25 | 1.50 | 82.2 | 21 | 2.3 | n.a. | n.a. |
| 6 | 0.20 | 1.34 | 67.1 | 17.8 | 2.1 | n.a. | n.a. |
| 7 | 0.29 | 1.49 | 60.1 | 15.2 | 2.3 | n.a. | n.a. |
| 8 | 0.25 | 1.43 | 48.7 [a] | n.a. | 2.2 | n.a. | n.a. | n.a. = not available
[a] after annealing at room temperature for 30 days

TABLE 2

| | | Example | | |
|---|---|---|---|---|
| | | A | 1 | 2 |
| Ethylene content | % wt (IR) | 2.3 | — | — |
| Hexene content | % wt (NMR) | — | 4.75 | 8.65 |
| | % mol (NMR) | — | 3.22 | 5.94 |
| Melt flow rate E | g/10' | 5.0 | 3.9 | 4.5 |
| $T_m$ Form II | ° C. | 75 | 93 | 80 [a] |
| $\Delta H_f$ Form II | J/g | n.a. | 32 [a] | 26 [a] |
| Tensile modulus (1–3% chord) | MPa | 103 | 106 | 85 |
| Tensile strength at yield | MPa | 6.6 | 6.6 | 5.3 |
| Tensile strength at break | MPa | 37.1 | 36.7 | 33.2 |
| Elongation at break | % | 434 | 366 | 444 | n.a. = not available
[a] after annealing at room temperature for 30 days

A comparison between the butene-ethylene (2.3% wt $C_2$, IR) copolymer of the prior art and the butene-hexene copolymer according to the present invention (4.75% wt $C_6$, $^{13}C$ NMR) points out the higher melting temperature and melting enthalpy of the latter, all the other properties being the same.

A comparison between the same butene-ethylene (2.3% wt $C_2$, IR) copolymer of the prior art and a more modified butene-hexene copolymer (8.65% wt $C_6$, $^{13}C$ NMR) according to the present invention points out the higher melting temperature and flexibility of the latter, all the other properties being similar. In table 2 the superiority of the butene-hexene copolymers of the present invention with respect to the butene-ethylene copolymer of the prior art is shown by a better thermal resistance and a higher flexibility.

The invention claimed is:

1. A process for preparing 1-butene copolymers comprising contacting 1-butene and at least one alpha olefin of formula $CH_2=CHZ$, wherein Z is a $C_3$-$C_{20}$ hydrocarbon group under polymerization conditions, in the presence of a catalyst system obtained by contacting:

a) at least a metallocene compound of formula (I) in the racemic form:

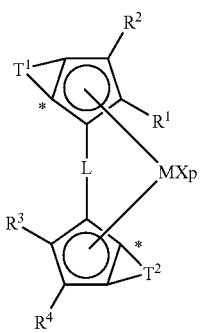

wherein

M is a transition metal belonging to group 3, 4, 5, 6 or to the lanthanide or actinide groups in the Periodic Table of the Elements;

p is an integer from 0 to 3, being equal to the formal oxidation state of the metal M minus 2;

X, equal to or different from each other, are hydrogen atoms, halogen atoms, or R, OR, $OSO_2CF_3$, OCOR, SR, $NR_2$ or $PR_2$ groups, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a OR'O group wherein R' is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, and $C_7$-$C_{20}$ arylalkylidene radicals optionally containing heteroatoms belonging to groups 13-17 of the Periodic Table of the Elements, and silylidene radical containing up to 5 silicon atoms;

$R^1$ and $R^3$, equal to or different from each other, are linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radicals, optionally containing heteroatoms belonging to groups 13-17 of the Periodic Table of the Elements;

$R^2$ and $R^4$, equal to or different from each other, are hydrogen atoms or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radicals, optionally containing heteroatoms belonging to groups 13-17 of the Periodic Table of the Elements;

$T^1$ and $T^2$, equal to or different from each other are a moiety of formula (II), (III) or (IV):

wherein the atom marked with the * is bound to the atom marked with the same symbol bonds in formula (I);

$R^5$, $R^6$, $R^7$, $R^8$ and $R^9$, equal to or different from each other, are hydrogen atoms, or a linear or branched saturated or unsaturated $C_1$-$C_{20}$-alkyl, $C_3$-$C_{20}$-cycloalkyl, $C_6$-$C_{40}$-aryl, $C_7$-$C_{40}$-alkylaryl, $C_7$-$C_{40}$-arylalkyl radicals, optionally containing heteroatoms belonging to groups 13-17 of the Periodic Table of the Elements;

$R^6$ and $R^7$ can also join to form a saturated or unsaturated condensed 5 to 7 membered ring optionally containing heteroatoms belonging to groups 13-16 of the Periodic Table of the Elements; and b) at least an alumoxane or a compound that forms an alkylmetallocene cation, wherein the 1-butene copolymers are isotatic and comprise an alpha olefin content of at most 30% by mol, and in the moiety of formula (II), $R^5$ and $R^8$ are hydrogen.

2. The process according to claim 1 wherein the catalyst system further comprises an organo aluminum compound.

3. The process according to claim 1 wherein in the compound of formula (I), M is titanium, zirconium or hafnium; X is a hydrogen atom, a halogen atom or a R group; L is selected from the group consisting of $Si(CH_3)_2$, $SiPh_2$, SiPhMe, $SiMe(SiMe_3)$, $CH_2$, $(CH_2)_2$, $(CH_2)_3$ and $C(CH_3)_2$ and $R^9$ is a hydrogen atom or a linear or branched saturated or unsaturated $C_1$-$C_{20}$-alkyl radical.

4. The process according to claim 1 wherein the metallocene compound has formula (V):

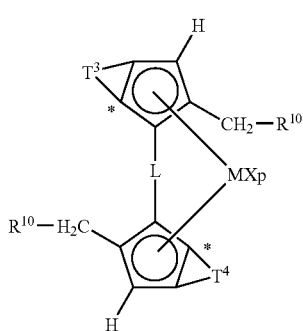
(V)

wherein $R^{10}$, equal to or different from each other, are hydrogen atoms, or linear or branched saturated or unsaturated $C_1$-$C_{19}$-alkyl, $C_3$-$C_{19}$-cycloalkyl, $C_6$-$C_{19}$-aryl, $C_7$-$C_{19}$-alkylaryl, $C_7$-$C_{19}$-arylalkyl radicals, optionally containing heteroatoms belonging to groups 13-17 of the Periodic Table of the Elements;

$T^3$ and $T^4$, equal to or different from each other are moieties of formula (Va), (Vb) or (Vc):

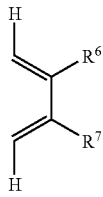
(Va)

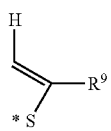
(Vb)

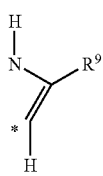
(Vc)

wherein the atom marked with the symbol * is bound to the atom marked with the same symbol in formula (V).

5. The process according to claim 4 wherein in the compound of formula (V), $R^{10}$ is a hydrogen atom or a $C_1$-$C_{19}$-alkyl radical; $R^6$, $R^7$ are hydrogen atoms or linear or branched saturated or unsaturated $C_1$-$C_{20}$-alkyl radicals, or they form a saturated or unsaturated 5 or 6 membered ring optionally containing heteroatoms belonging to groups 13-16 of the Periodic Table of the Elements; and $R^9$ is a linear or branched saturated or unsaturated $C_1$-$C_{20}$-alkyl radical.

6. The process according to claim 1 wherein the metallocene compound has formula (VI):

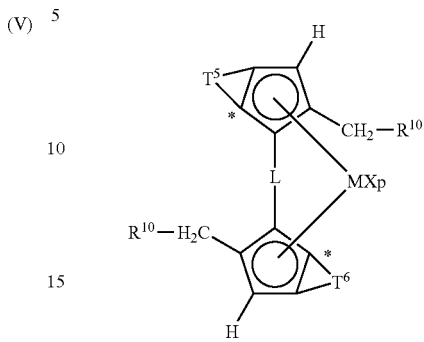
(VI)

wherein $R^{10}$, equal to or different from each other, are hydrogen atoms, or linear or branched saturated or unsaturated $C_1$-$C_{19}$-alkyl, $C_3$-$C_{19}$-cycloalkyl, $C_6$-$C_{19}$-aryl, $C_7$-$C_{19}$-alkylaryl, $C_7$-$C_{19}$-arylalkyl radicals, optionally containing heteroatoms belonging to groups 13-17 of the Periodic Table of the Elements;

$T^5$ and $T^6$, equal to or different from each other are a moiety of formula (VIa), (VIb) or (VIc):

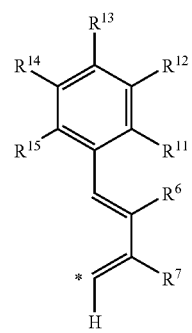
(VIa)

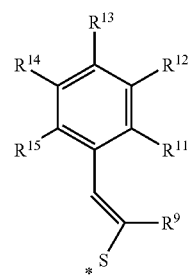
(VIb)

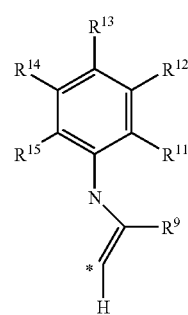
(VIc)

wherein the atom marked with the symbol * is bound to the atom marked with the same symbol in formula (VI);

$R^{11}$, $R^{12}$, $R^{13}$, $R^{14}$ and $R^{15}$, equal to or different from each other, are hydrogen atoms or linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radicals, optionally containing heteroatoms belonging to groups 13-17 of the Periodic Table of the Elements, or two adjacent groups form together a saturated or unsaturated condensed 5 or 6 membered ring optionally containing heteroatoms belonging to groups 13-16 of the Periodic Table of the Elements.

7. The process according to claim 6 wherein $R^6$ and $R^7$ are hydrogen atoms or linear or branched saturated or unsaturated $C_1$-$C_{20}$-alkyl radicals; or they form a saturated or unsaturaded 5 or 6 membered ring optionally containing heteroatoms belonging to groups 13-16 of the Periodic Table of the Elements; $R^9$ is a hydrogen atom or a linear or branched saturated or unsaturated $C_1$-$C_{20}$-alkyl radical; $R^{11}$ is a $C_1$-$C_{20}$-alkyl radical; $R^{14}$ is a hydrogen atom or a $C_1$-$C_{20}$-alkyl radical; and $R^{12}$, $R^{13}$ and $R^{15}$ are hydrogen atoms.

8. The process according to claim 1 wherein the alpha-olefin is selected from 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene.

9. The process according to claim 8 wherein the alpha-olefin is selected from 1-pentene, 1-hexene and 1-octene.

10. The process according to claim 1 wherein the content of the at least one alpha olefin derived units in the copolymer is from 2% to 20% by mol.

11. The process according to claim 8 wherein the alpha-olefin is selected from 4-methyl-1-pentene, 4,6-dimethyl-1-heptene, 1-decene, 1-tetradecene, 1-hexadecene, 1-octadecene and 1-eicosene.

* * * * *